UNITED STATES PATENT OFFICE.

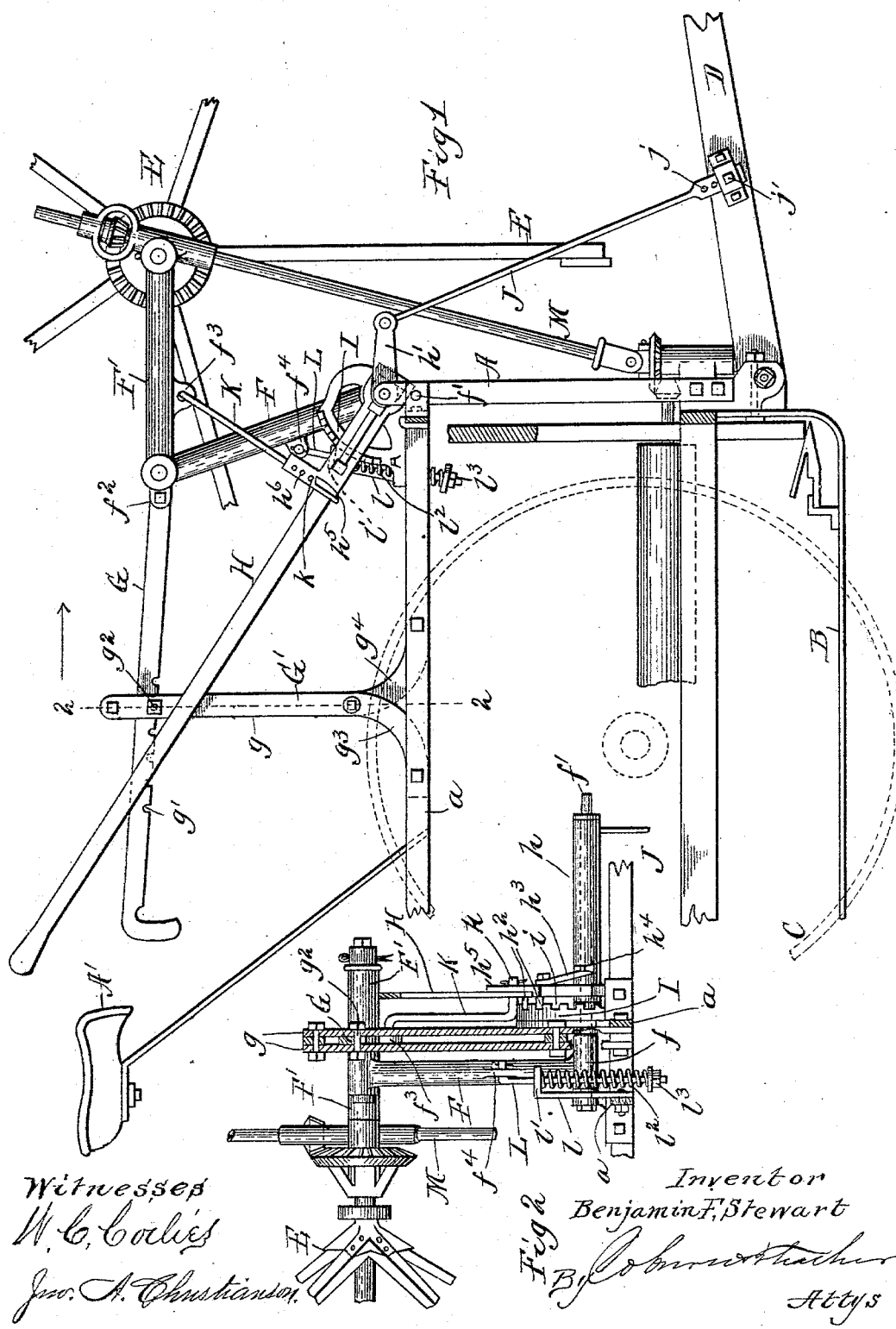

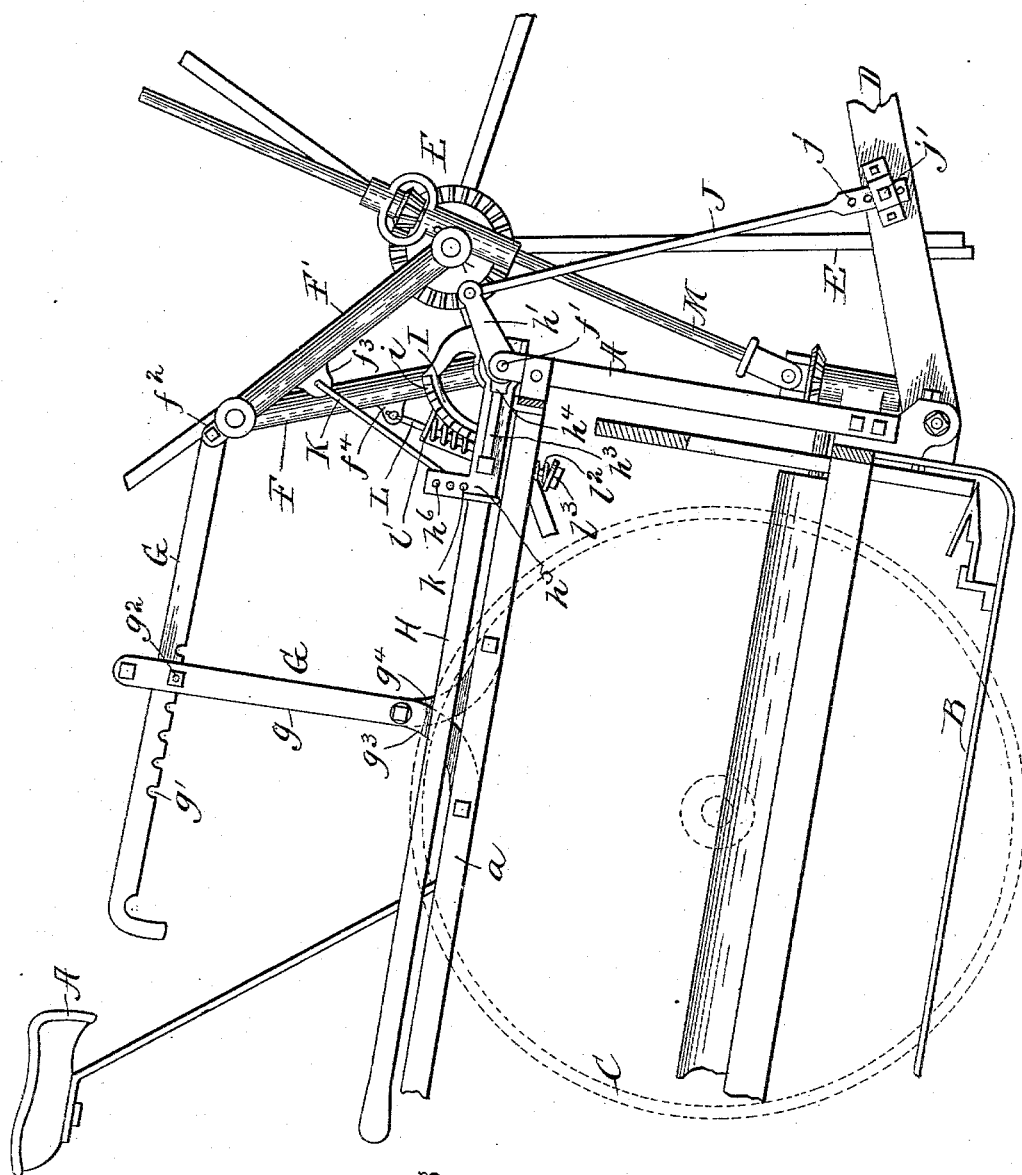

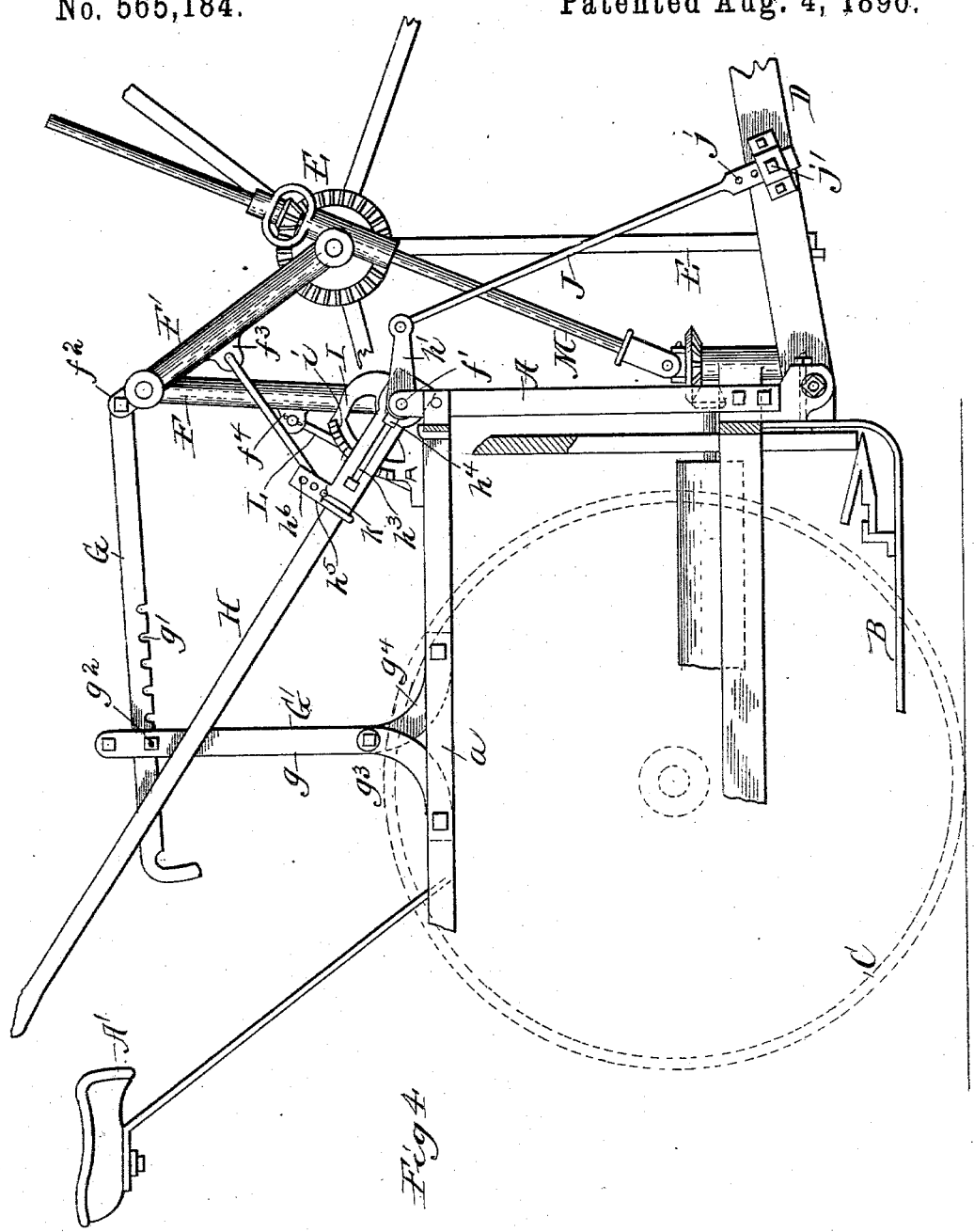

BENJAMIN F. STEWART, OF CANTON, OHIO.

HARVESTER-REEL.

SPECIFICATION forming part of Letters Patent No. 565,184, dated August 4, 1896.

Application filed November 8, 1893. Serial No. 490,351. (No model.)

*To all whom it may concern:*

Be it known that I, BENJAMIN F. STEWART, a citizen of the United States, residing at Canton, in the county of Stark and State of Ohio, have invented certain new and useful Improvements in Harvester-Reels, which are fully set forth in the following specification, reference being had to the accompanying drawings, in which—

Figure 1 represents a cross-section of a grain-harvester embodying my invention, taken outside the main wheel and showing a side elevation of the reel and connecting apparatus; Fig. 2, a detail section of the same, taken on the line 2 2 of Fig. 1; Fig. 3, a similar view showing the coincident adjustment of the platform and reel from the position shown in Fig. 1, and Fig. 4 a similar view showing the adjustment of the reel alone from the position shown in Fig. 1.

My invention relates to harvesting-machines in which the grain-platform and finger-beam or main frame may be adjusted vertically and in which the reel is adjustable both vertically and horizontally.

The principal object of the present invention is to provide for the coincident vertical adjustment of the platform or finger-beam and the reel, and the main feature of the invention is the connection of the vertically-adjustable reel-support with the mechanism for adjusting the finger-beam whereby both are adjusted together by the movement of a single lever.

In the drawings, A represents the upright portion of the main frame of a harvester of ordinary construction, to which the platform-frame B is rigidly connected in the usual way, and the entire main frame is carried by a ground-wheel C, on which the frame is mounted. The pole or tongue D is hinged at its rear end to the frame in any usual manner, all of these parts being of ordinary construction and requiring no special description.

The main parts of the mechanism for supporting and adjusting the reel are substantially like those described and shown in my prior application, Serial No. 399,921, filed July 18, 1891, the reel E being mounted on a double-jointed support consisting of two arms F and F', the former being the vertical and the latter the horizontal member of this well-known variety of supports for reels. The two arms are hinged together by a joint located at the upper end of the vertical and the inner end of the horizontal arm, and the reel E is mounted at the outer end of the horizontal arm F'. The vertical or upright arm F is rigidly connected with a short sleeve $f$ at its lower end, which is mounted loosely on a long journal pin or rod $f'$, supported in suitable bearings on the upright frame. This arm F may, therefore, be swung back and forth to set the reel in and out horizontally, the sleeve $f$ oscillating on its bearing for this purpose. To effect this a bar G is connected to the jointed reel-support in such a way that the thrusting of this bar forward and backward will swing the upright arm of the support in the same direction.

The upper supporting-arm F' is shown provided with a short lug $f^2$, projecting slightly to the rear, as seen in Fig. 1, to which the forward end of the bar is pivoted, and thence extends back horizontally to a standard G', which, as shown in the drawings, is composed of two upright arms $g$, standing a little distance apart and secured together by proper bolts, separating-blocks being arranged between the arms to preserve the open space. The bar G passes back through the space between these two arms and is provided on its lower edge with a series of notches $g'$, which are adapted to engage with a pin or bolt $g^2$, passing through the two arms near the upper end thereof, as seen in Figs. 1 and 2. This provides for the setting of the bar in any position desired by engaging any one of the notches therein with the pin just mentioned, and the movement of this bar in the direction of its length will obviously swing the upright member of the reel-support, thereby giving a horizontal adjustment to the reel. This bar extends back so as to be easily reached by a driver on the seat A', mounted as usual on seat-bars $a$ on the upright frame. To brace the arms of the standard G', their lower ends are bent and arranged so that the bend of one will extend toward the front and the other toward the rear of the machine, as seen in Fig. 1, in which these parts are indicated by $g^3$ and $g^4$, respectively. The sleeve $f$ extends inward to a rack-segment, (which will presently be described,) as seen in Fig.

2, where the parts in rear thereof are broken away. The journal-pin $f'$ extends through this rack-segment. A second lever H is secured to a second sleeve $h$, which is mounted loosely on the same journal-pin with the sleeve $f$, but on the opposite side of the rack-segment I, which is fastened to the frame in a plane, crossing said bearing-pin, which passes through this segment-plate, as already mentioned, and the latter becomes a separating plate or diaphragm between the two sleeves. The sleeve $h$ runs out to the same plane as the pole or a little beyond the same and is provided near its outer end with a stiff crank-arm $h$ to which the pole D is connected by a link-rod J, the upper end of which is pivoted to the crank-arm while the lower end is similarly connected to the pole a little distance in front of its hinge connection with the main frame, as seen in Fig. 1. The lower end of this connecting-rod is provided with a series of holes $j$, through some one of which the connecting pivot-pin $j'$ passes to secure the rod to the pole, and these several apertures provide for the adjustment of the distance between the two hinge connections of the rod, as may be required.

The rack-plate I is provided with a segment of rack-teeth or notches $i$, with which lugs or teeth $h^2$ on the inside of the lever H engage, thus providing for securing the lever in any position of adjustment. The lever is capable of some lateral movement to disengage it from the rack for adjustment, and on the outside thereof there is provided a spring $h^3$, fastened at one end to the lever and extending inward and sidewise therefrom until its free end engages with a short lug $h^4$ on the sleeve, as seen in Fig. 2, the normal action of this spring being to hold the lever in engagement with the rack. The lever extends back to the driver's seat. This lever H is connected with the upper or horizontal member F' of the double-jointed reel-support by means of a link-rod K, which is hinged at its upper end to a lug $f^3$ on the said arm F', while at its opposite end it is hinged to the said lever H. For the purpose of adjustment the connection between one or the other of these devices is made adjustable. In the drawings the device for this purpose is shown on the lever, and consists of a laterally-projecting lug $h^5$, provided with a series of apertures $h^6$, into either of which the lower end of the link-rod may be inserted, this end being bent outward to form an angular end section $k$, which is inserted in one of the said apertures and secured, as seen in Fig. 2. Obviously with this connection between the said lever H and the reel-support arm F' the vibration of this lever will move the reel-supporting arm correspondingly, and thereby raise and lower the reel. But the lever is also connected with the pole and is utilized to raise and lower the cutting apparatus by its action on the hinged pole, whereby the main frame is tilted by the operation of this lever, this being its ordinary well-known function in the construction and organization of machines heretofore known. With the improvement here shown and described, however, it will be seen that by the operation of the said lever H, heretofore known as the "tilting lever" for the main frame, it performs not only the function of raising and lowering the cutting apparatus, as before, but also simultaneously raising and lowering the reel coincidently with the said adjustment of the cutting apparatus and in the same direction. In the ordinary operation of this tilting lever the depression of the lever depresses or lowers the fingers by a suitable tilt of the main frame, this being accomplished by the upward pull on the hinged tongue, as seen in Fig. 3; but this depression of the lever will, of course, produce a downward pull on the reel-supporting arm F', thereby lowering the reel simultaneously with the lowering of the cutting apparatus. The opposite movement of the lever will, of course, produce the opposite result, raising both the cutting apparatus and reel.

The natural tendency of the double-jointed reel-support is to move or turn forward under the weight of the reel, and on this account the rearward adjustment, by means of the bar G alone, requires considerable force. To counteract this tendency and thereby render the horizontal adjustment of the reel easier for the attendant, a counterbalancing-spring is applied, the normal action of which is to retain the upright arm F in its rear adjustment, as seen in Figs. 1 and 2. This device consists of a rod L, hinged at one end to the upright arm F by means of a side lug $f^4$. A keeper $l$, in the form of an angular standard, is secured at its lower end to the main frame or, as seen in Fig. 2, to one of the seat-bars. The upper end $l'$ of this standard is bent at right angles to the main or upright portion thereof and into a horizontal position, and the link-rod L passes loosely through a suitable aperture in this bent end. A spiral spring $l^2$ is applied to the end of the said rod, projecting beyond its bearing in the said standard, which forms a sort of keeper for the rod. The extension of the rod beyond its said bearing is considerable, so as to provide for a spring of considerable length, and the latter is held in position by a nut $l^3$ on the extremity of the rod. Now, this spring being adjusted so that when the arm F is thrown back to its rear position, as seen in Fig. 1, the spring will be about normal, and it is obvious that whenever the arm swings forward the spring will be compressed, and so will resist the tendency to move forward under the weight of the reel, as mentioned above, and the farther the forward thrust is made the greater will be the compression of the spring, so that in the return adjustment of the parts the spring assists and so aids the attendant in adjusting the reel-support through the bar G.

The reel may be driven by any suitable device. In the drawings I have shown a tumbling-shaft M and its connections for this purpose, the same as in my prior application aforesaid, but as this device forms no part of my present invention a specific description is not here required. The operation of these devices may be briefly explained as follows: In Fig. 1 the devices are shown in adjustment for average work, that is, for cutting grain of average height. Now, it may be desirable to temporarily lower the reel in such work without tilting the main frame and thereby changing the position of the cutting apparatus. This is effected through the bar G alone, and in operation it is desirable to thrust the said lever forward to bring the upright supporting-arm F into a substantially vertical position, as seen in Fig. 4. At the same time the horizontal supporting-arm F' will be turned on its joint, thereby lowering the reel, as seen in said Fig. 4, the jointed link K turning on its pivotal connections to accommodate this movement, so that it furnishes no obstruction whatever to the same while the lever H remains fixed in its former stationary position. This adjustment is illustrated in Fig. 4 of the drawings. It will be noticed that the projecting lug $f^2$ on the arm F' is thrown upward by this movement, as seen in Fig. 4, and this furnishes a leverage in returning the reel to its former position by a pull backward on the bar G, the retracting-spring also aiding in this return adjustment to some extent.

Now, if a patch of short straw-grain is encountered it may be desirable to lower both the cutting apparatus and the reel. To effect this the bar G is left undisturbed and the lever H is depressed, as seen in Fig. 3, which movement tilts the main frame to depress the cutting apparatus and at the same time pulls down the horizontal supporting-arm of the reel, so as to lower the latter simultaneously with the cutting apparatus, thereby bringing both into a lower position of adjustment, as seen in Fig. 3, the movement being effected simultaneously by the operation of the single lever H. Of course the return or raising movement of the lever will return the reel and cutting apparatus to the former position for average work, (illustrated in Fig. 1 of the drawings,) and obviously these parts may be adjusted to a still higher position from that shown in Fig. 1 to suit remarkably long straw by raising the said lever H still higher, as occasion may require.

There may be modifications in the specific devices and in the specific construction and arrangement of the actual devices here shown and described without losing the main feature of my invention, which consists in connecting the tilting mechanism with the reel-support in such a way that the tilting of the platform will simultaneously adjust both the reel and cutting apparatus in the same direction; and such modifications I contemplate as within my invention so long as the main feature is retained. The reel-support may be connected to the pole or some other part instead of the lever. It is also obvious that this main feature of my invention is not limited to a double-jointed reel-support, but may be applied to a single hinge-support, which may be swung upon its joint to give vertical adjustment only to the reel. If the upright arm F were rigid and the horizontal arm F' jointed thereto, as described, it would be an example of such construction. It is evident that in such a construction if the single swinging support be connected to the tilting lever, as herein described, the vertical adjustment of the cutting apparatus and reel will be effected simultaneously, the same as described above. In such a construction, however, there will be no horizontal adjustment of the reel unless some other special device is provided for this purpose.

Having thus described my invention, what I claim to be new, and desire to secure by Letters Patent, is—

In a harvester, the main frame and platform, in combination with the tongue or pole hinged thereto, a tilting lever connected to the pole, a two-part reel-support consisting of an upright member pivotally mounted at its lower end on the main frame, on which pivot it turns or swings vertically, and a second member pivoted at one end to the upper end of the former and projecting forward therefrom in nearly a horizontal position, a connecting-rod hinged or pivoted to the tilting lever at one end and at the other end to the horizontal member of the reel-support, and a thrust bar or lever, pivoted at one end to the reel-support near the junction of its two parts, whereby the platform and cutting apparatus thereon and the reel may be simultaneously adjusted vertically by the tilting lever alone, or the reel adjusted, both horizontally and vertically, by the thrust-bar alone, substantially as described.

BENJAMIN F. STEWART.

Witnesses:
R. C. PAGE,
LE OTIE LIEB.